United States Patent
Tao et al.

(10) Patent No.: US 12,408,203 B2
(45) Date of Patent: Sep. 2, 2025

(54) ADJUSTMENT FOR TIMING ADVANCE

(71) Applicant: Nokia Technologies Oy, Espoo (FI)

(72) Inventors: Tao Tao, Shanghai (CN); Timo Lunttila, Espoo (FI)

(73) Assignee: Nokia Techologies Oy, Espoo (FI)

( * ) Notice: Subject to any disclaimer, the term of this patent is extended or adjusted under 35 U.S.C. 154(b) by 353 days.

(21) Appl. No.: 17/907,418

(22) PCT Filed: Apr. 10, 2020

(86) PCT No.: PCT/CN2020/084293
§ 371 (c)(1),
(2) Date: Sep. 27, 2022

(87) PCT Pub. No.: WO2021/203432
PCT Pub. Date: Oct. 14, 2021

(65) Prior Publication Data
US 2023/0118130 A1    Apr. 20, 2023

(51) Int. Cl.
H04W 74/0816    (2024.01)
H04W 56/00    (2009.01)
(Continued)

(52) U.S. Cl.
CPC ..... *H04W 74/0816* (2013.01); *H04W 56/004* (2013.01); *H04W 74/006* (2013.01); *H04W 74/0866* (2013.01)

(58) Field of Classification Search
CPC ........... H04W 74/0816; H04W 56/004; H04W 74/006; H04W 74/0866
See application file for complete search history.

(56) References Cited

U.S. PATENT DOCUMENTS

2018/0227936 A1* 8/2018 Yerramalli ............ H04L 1/0031
2019/0082474 A1* 3/2019 Jung ................. H04W 74/0891
(Continued)

FOREIGN PATENT DOCUMENTS

CN    108476506 A    8/2018
CN    108781424 A    11/2018
(Continued)

OTHER PUBLICATIONS

Extended European Search Report received for corresponding European Patent Application No. 20930225.6, dated Feb. 27, 2023, 10 pages.
(Continued)

Primary Examiner — Jael M Ulysse
(74) Attorney, Agent, or Firm — Barta Jones, PLLC

(57) ABSTRACT

Example embodiments of the present disclosure relate to devices, methods, apparatuses and computer readable storage media of the adjustment of the Timing Advance (TA). The method comprises determining a channel occupancy time structure for accessing a radio channel between the first device and a second device, the channel occupancy time structure indicating a set of time-domain resources for accessing the radio channel; and setting a timing advance for a transmission from the first device to the second device based on the channel occupancy time structure. In this way, a dynamic adjustment of TA is allowed at the UE, which ensures that a desire duration of the gaps of the channel occupancy at different transmission scenarios.

14 Claims, 5 Drawing Sheets

(51) Int. Cl.
*H04W 74/00* (2009.01)
*H04W 74/08* (2009.01)

(56) References Cited

U.S. PATENT DOCUMENTS

| | | | | |
|---|---|---|---|---|
| 2019/0150170 | A1 | 5/2019 | Park et al. | |
| 2019/0313409 | A1* | 10/2019 | Tian | H04W 72/0453 |
| 2020/0037354 | A1 | 1/2020 | Li et al. | |
| 2020/0052865 | A1* | 2/2020 | Liou | H04W 24/08 |
| 2020/0053713 | A1 | 2/2020 | Bang et al. | |
| 2020/0053798 | A1* | 2/2020 | Tsai | H04W 72/23 |
| 2020/0275430 | A1* | 8/2020 | Salem | H04L 1/1614 |
| 2020/0280971 | A1* | 9/2020 | Moon | H04L 5/0053 |
| 2020/0314891 | A1* | 10/2020 | Li | H04W 74/006 |
| 2020/0359411 | A1* | 11/2020 | Li | H04W 16/14 |
| 2021/0058970 | A1* | 2/2021 | Kwak | H04W 72/23 |
| 2021/0185719 | A1* | 6/2021 | Xue | H04L 5/0092 |
| 2021/0219341 | A1* | 7/2021 | Jia | H04W 72/0446 |
| 2021/0297223 | A1* | 9/2021 | Yang | H04L 1/1664 |
| 2022/0086902 | A1* | 3/2022 | Oh | H04W 16/14 |
| 2022/0131725 | A1* | 4/2022 | Li | H04L 5/0048 |
| 2022/0210830 | A1* | 6/2022 | Lin | H04W 74/0833 |
| 2022/0240312 | A1* | 7/2022 | Xu | H04L 5/0037 |
| 2022/0287091 | A1* | 9/2022 | Murayama | H04W 72/232 |
| 2023/0180260 | A1* | 6/2023 | Nogami | H04W 72/231 370/329 |
| 2023/0328788 | A1* | 10/2023 | Xu | H04W 48/12 370/329 |

FOREIGN PATENT DOCUMENTS

| | | | |
|---|---|---|---|
| CN | 109417792 | A | 3/2019 |
| CN | 110475338 | A | 11/2019 |
| EP | 3355646 | A1 | 8/2018 |
| JP | 2017-192070 | A | 10/2017 |
| WO | 2019/215670 | A1 | 11/2019 |
| WO | 2019/227316 | A1 | 12/2019 |
| WO | 2020/061583 | A1 | 3/2020 |
| WO | 2020/066606 | A2 | 4/2020 |

OTHER PUBLICATIONS

"Frame structure for NR-U", 3GPP TSG RAN WG1 Meeting #94bis, R1-1812974, Agenda: 7.2.2.2, Samsung, Nov. 12-16, 2018, 7 pages.
Office Action received for corresponding Japanese Patent Application No. 2022-561562, dated Oct. 3, 2023, 3 pages of Office Action and 10 pages of summary available.
Office Action received for corresponding Chinese Patent Application No. 202080100577.3, dated May 6, 2024, 14 pages of Office Action and No. page of translation available.
"3rd Generation Partnership Project; Technical Specification Group Radio Access Network; NR; Requirements for support of radio resource management (Release 16)", 3GPP TS 38.133, V16.2.0, Dec. 2019, 1130 pages.
"3rd Generation Partnership Project; Technical Specification Group Radio Access Network; NR; Physical channels and modulation (Release 16)", 3GPP TS 38.211, V16.0.0, Dec. 2019, pp. 1-129.
"3rd Generation Partnership Project; Technical Specification Group Radio Access Network; Physical layer procedures for shared spectrum channel access (Release 16)", 3GPP TS 37.213, V16.0.0, Dec. 2019, pp. 1-25.
International Search Report and Written Opinion received for corresponding Patent Cooperation Treaty Application No. PCT/CN2020/084293, dated Dec. 30, 2020, 9 pages.
"Channel access and co-existence for NR-U operation", 3GPP TSG RAN WG1 Meeting #94bis, R1-1810615, Agenda: 7.2.2.4.1, Nokia, Oct. 8-12, 2018, 6 pages.
"On DL signals and channels", 3GPP TSG RAN WG1 Meeting #98bis, R1-1910602, Agenda: 7.2.2.1.2, Nokia, Oct. 14-20, 2019, 17 pages.
Action received for corresponding Indian Patent Application No. 202247063976, dated Apr. 18, 2023, 6 pages.
Office Action received for corresponding Vietnamese Patent Application No. 1-2022-07111, dated Sep. 6, 2024, 2 pages of Office Action and 2 pages of translation available.
Office Action received for corresponding Chinese Patent Application No. 202080100577.3, dated Oct. 30, 2024, 12 pages of Office Action and no page of translation available.

\* cited by examiner

ADJUSTMENT FOR TIMING ADVANCE

RELATED APPLICATION

This application was originally filed as PCT Application No. PCT/CN2020/084293 on Apr. 10, 2020, which is incorporated herein by reference in its entirety.

FIELD

Embodiments of the present disclosure generally relate to the field of telecommunication and in particular, to devices, methods, devices and computer readable storage media of the adjustment of the timing advance (TA).

BACKGROUND

In New Radio (NR), it has been defined that the uplink frame transmission takes place a time period before the reception of the first detected path of the corresponding downlink frame from the reference cell. The reference point of the timing control requirement at a User Equipment (UE) for initiating a first transmission shall be the downlink timing of the reference cell minus the time period.

It has also been defined different schemes for Listen Before Talk (LBT) for sensing the channel activity. Once the channel is declared as idle, the node can access the channel for a maximum time known as the maximum channel occupancy time (MCOT). During that time, the initiating node can share its COT to responding node for data transmission.

Both gNB-initiated COT sharing and UE-initiated COT sharing is supported in NR. In COT sharing conditions, gNB/UEs are allowed to access the channel by performing Type 2 LBT within a COT acquired by the UE or the gNB.

SUMMARY

In general, example embodiments of the present disclosure provide a solution of the adjustment of the TA.

In a first aspect, there is provided a first device. The first device comprises at least one processor; and at least one memory including computer program codes; the at least one memory and the computer program codes are configured to, with the at least one processor, cause the first device at least to determine a channel occupancy time structure for accessing a radio channel between the first device and a second device, the channel occupancy time structure indicating a set of time-domain resources for accessing the radio channel; and set a timing advance for a transmission from the first device to the second device based on the channel occupancy time structure.

In a second aspect, there is provided a second device. The second device comprises at least one processor; and at least one memory including computer program codes; the at least one memory and the computer program codes are configured to, with the at least one processor, cause the second device at least to determine a channel occupancy time structure for accessing a radio channel between a first device and the second device, the channel occupancy time structure indicating a set of time-domain resources for accessing the radio channel; and transmit the channel occupancy time structure to the first device, to cause the first device to determine a timing advance for a transmission from the first device to the second device.

In a third aspect, there is provided a method. The method comprises determining a channel occupancy time structure for accessing a radio channel between the first device and a second device, the channel occupancy time structure indicating a set of time-domain resources for accessing the radio channel; and setting a timing advance for a transmission from the first device to the second device based on the channel occupancy time structure.

In a fourth aspect, there is provided a method. The method comprises determining a channel occupancy time structure for accessing a radio channel between a first device and the second device, the channel occupancy time structure indicating a set of time-domain resources for accessing the radio channel; and transmitting the channel occupancy time structure to the first device, to cause the first device to determine a timing advance for a transmission from the first device to the second device.

In a fifth aspect, there is provided an apparatus comprises means for determining a channel occupancy time structure for accessing a radio channel between the first device and a second device, the channel occupancy time structure indicating a set of time-domain resources for accessing the radio channel; and means for setting a timing advance for a transmission from the first device to the second device based on the channel occupancy time structure.

In a sixth aspect, there is provided an apparatus comprises means for determining a channel occupancy time structure for accessing a radio channel between a first device and the second device, the channel occupancy time structure indicating a set of time-domain resources for accessing the radio channel; and means for transmitting the channel occupancy time structure to the first device, to cause the first device to determine a timing advance for a transmission from the first device to the second device.

In a seventh aspect, there is provided a computer readable medium having a computer program stored thereon which, when executed by at least one processor of a device, causes the device to carry out the method according to the third aspect or a fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
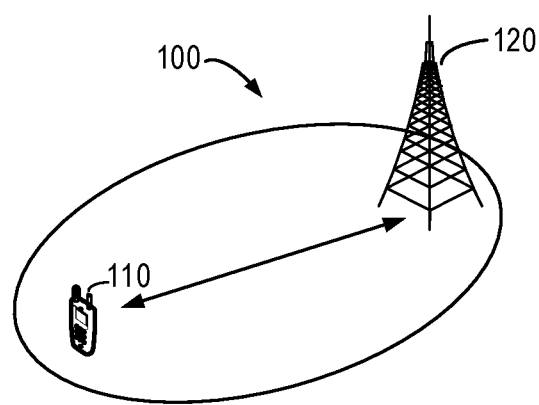
FIG. 1 shows an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/of" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 comprises a terminal device 110 (hereafter also referred to as a first device 110 or a UE 110) and a network device 120 (hereafter also referred to as a second device 120 or a gNB 120). The terminal device 110 may communicate with the network device 120. It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In New Radio (NR), it has been defined that the uplink frame transmission takes place a time period before the reception of the first detected path of the corresponding downlink frame from the reference cell. The time period may be represented as $(N_{TA}+N_{TA\ offset}) \times T_c$. $N_{TA}$ may be referred to as a time period for compensating propagation delay and $N_{TAoffset}$ may be used to provide enough gap for a gNB performing receiving (Rx) to Transmitting (Tx) Radio Frequency (RF) switching (from Uplink (UL) to Downlink (DL)) in a Time Division Duplex (TDD) system. For Physical Random Access Channel (PRACH), $N_{TA}$ is defined as 0. The reference point of the timing control requirement at a User Equipment (UE) for initiating a transmission shall be the downlink timing of the reference cell minus the $(N_{TA}+N_{TA\ offset}) \times T_c$. The downlink timing is defined as the time when the first detected path of the corresponding downlink frame is received from the reference cell.

$(N_{TA}+N_{TA\ offset}) \times T_c$ for other channels is the difference between UE transmission timing and the downlink timing immediately after when the last timing advance was applied. $N_{TA}$ for other channels is not changed until next timing advance is received. The value of $N_{TAoffset}$ depends on the duplex mode of the cell in which the uplink transmission takes place and the frequency range (FR). $N_{TAoffset}$ may be defined as below.

TABLE 1

The value of $N_{TAoffset}$

| Frequency range and band of cell used for uplink transmission | $N_{TA\ offset}$ (Unit: $T_C$) |
|---|---|
| FR1 FDD band without LTE-NR coexistence case or FR1 TDD band without LTE-NR coexistence case | 25600 (Note 1) |
| FR1 FDD band with LTE-NR coexistence case | 0 (Note 1) |
| FR1 TDD band with LTE-NR coexistence case | 39936 (Note 1) |
| FR2 | 13792 |

Note 1:
The UE identifies $N_{TA\ offset}$ based on the information n-TimingAdvanceOffset according to [2]. If UE is not provided with the information n-TimingAdvanceOffset, the default value of $N_{TA\ offset}$ is set as 25600 for FR1 band. In case of multiple UL carriers in the same TAG, UE expects that the same value of n-TimingAdvanceOffset is provided for all the UL carriers according to clause 4.2 in TS 38.213 [3] and the value 39936 of $N_{TA\ offset}$ can also be provided for a FDD serving cell.
Note 2:
Void The numbers for FR1 TDD bands, i.e. $N_{TAoffset}$ of 25600 and 39936 Tc corresponds to approximately 13 and 20 microseconds, respectively.

It has also been defined different schemes for Listen Before Talk (LBT) for sensing the channel activity, such as Type 1 and Type 2. Type 1 LBT, also known as Category 4 LBT (Cat.4 LBT), is defined as a continuous sensing of the channel activity for, at least, N Clear Channel Assessment (CCA) intervals (N being a random number obtained from a uniform distribution). Once the channel is declared as idle, the node can access the channel for a maximum time known as the maximum channel occupancy time (MCOT). During that time, the initiating node can share its COT to responding node for data transmission.

Both gNB initiated COT sharing and UE initiated COT sharing is supported in New Radio Unlicensed (NR-U). In COT sharing conditions, gNB/UEs are allowed to access the channel by performing Type 2 LBT within a COT acquired by a UE or the gNB, respectively. Moreover, within a gNB acquired COT, the gNB can re-access the channel after a pause in the DL burst or after a UL burst using Cat.2 LBT as well.

Category 2 LBT (Cat.2 LBT) is defined as a CCA check performed for a specific limited interval of time. A summary of the types of LBT supported in 3GPP can be represented as below:

TABLE 2 types of LBT

| LBT Category | LBT Type | Description | LBT measurement duration | Use Case |
|---|---|---|---|---|
| Cat 1 | Type 2C | Immediate transmission without LBT for up to 584 µs | No LBT, duration of the gap is 16 µs | UL following DL within a gNB-initiated COT, e.g. PUCCH, or DL following UL in a UE initiated COT (e.g. control) |
| Cat 2 | Type 2B (16 µs) Type 2A (25 µs) | Single-shot LBT | 16 µs or 25 µs | Prior to DRS (25 µs LBT), or for UL channels within a gNB-initiated channel occupancy, or DL following UL in a UE initiated COT |
| Cat 4 | Type 1 | LBT with exponential back-off | Channel needs to be sensed to be idle a certain number of times | Initiation of a channel occupancy (by gNB or UE) |

As mention above, two factors are contributing into advanced UL transmit timing, namely $N_{TA}$ and $N_{TAoffset}$. Different from operation in licensed bands, the gNB requires not only RF switching but also LBT operation in NR-U, when the transmission direction switches from UL to DL. According to TA definition in the current 3GPP specifications, there may be no sufficient gap for gNB to perform CCA before expected DL transmission.

Figure 2:
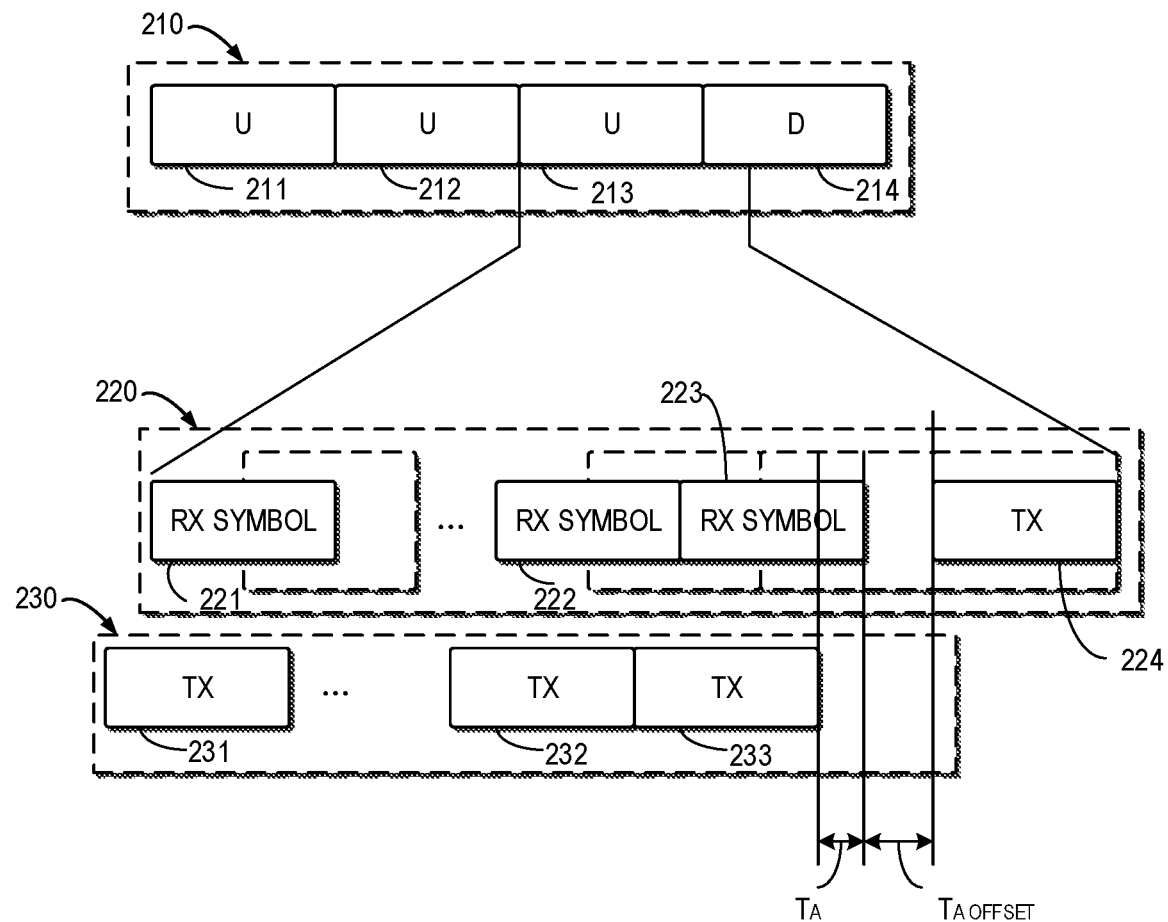
FIG. 2 shows an example of a gap for a Clear Channel Assessment (CCA) process of the gNB.

FIG. 2 shows an example of a gap for a CCA process of the gNB. A UE performs Type 1 channel access to initiate an UL burst with 3 slots. The gNB aims to transmit in the last slot by enjoying COT acquired by the UE. As shown in FIG. 2, a COT structure 210 indicates a set of UL transmissions 211-213 and a DL transmission 214 and the DL 214 transmission follows the set of UL transmissions 211-213.

For the UL transmission 213, FIG. 2 shows UE timing 230 for transmission and a gNB timing 220 for receiving the data from the UE. In UE timing, transport blocks 231-233 are transmitted. Those transmitted transport blocks 231-233 are received by the gNB shown by the received symbols 221-223. It can be seen from FIG. 2 that there is a gap between the transmitted transport blocks and the received symbols 221-223, which may be represented as $T_A$ in FIG. 2. According to the gNB timing 220, it can be seen that there is an offset between the last received symbol 223 and the start of transmission initiated by the gNB, which may be represented as $T_{A\ offset}$ in FIG. 2. The offset may equal to $N_{TAoffset} \times T_c \approx 13$ or 20 µs, depending on whether the given frequency band is considered to co-exist with LTE. According to channel access mechanism defined in NR-U, the gNB can perform Type 2 channel access before the DL burst. However, such offset is not sufficient for Type 2Accessing a radio channel and is not fully match to Type 2B channel access either. That means the DL transmission cannot be started at the expected slot or symbol boundary at least for Type 2Accessing a radio channel. The further delay in starting the transmission complicates the gNB's scheduling operation, and also makes it more likely that other devices (e.g. NR-U, LTE LAA or Wi-Fi) grab the channel in the meanwhile for their own transmission.

It has been considered assigning a larger TA to UE to create sufficient gap. However, in a gNB initiated COT, a larger $N_{TAoffset}$ may increase the guard period between DL to UL. For example, in 30 kHz and 60 kHz SCS cases, one symbol guard period may be sufficient to cover current TA and UE Rx-Tx switching time. With larger TA, two-symbol guard period may be required, which will reduce the efficiency of the whole network. Furthermore, in some cases (e.g., in low traffic load situation), the DL transmission will not directly follow a UL transmission. Increasing $N_{TAoffset}$ cannot bring any benefit in these cases.

Moreover, it has been considered adjusting TA via Medium Access Control Element (MAC CE). However, such slow manner cannot promptly react to fast-changing COT structures in NR-U.

Therefore, the embodiments in accordance with the present disclosure propose a new TA adjustment mechanism to increase COT sharing efficiency in unlicensed spectrum. In this solution, the UE may determine a COT structure. Based on the COT structure, the TA may be adjusted on demand.

Figure 3:
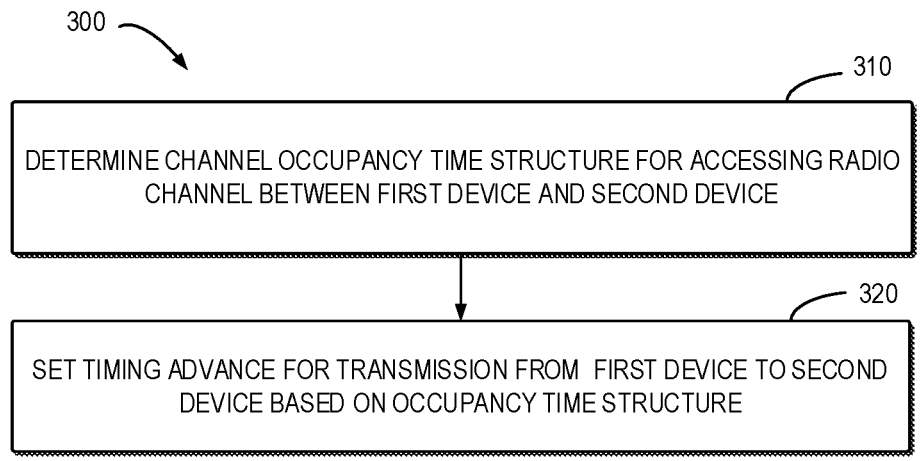
FIG. 3 shows a flowchart of an example method of the adjustment of the TA according to some example embodiments of the present disclosure.

Principle and implementations of the present disclosure will be described in detail below with reference to FIG. 3. FIG. 3 shows a flowchart of an example method 300 of the adjustment of the TA according to some example embodiments of the present disclosure. The method 300 can be implemented at the terminal device 110 as shown in FIG. 1. For the purpose of discussion, the method 300 will be described with reference to FIG. 1.

For adjusting the TA, the terminal device 110 may first try to determine whether a COT structure is able to be determined, for example, based on control information such as DCI. As shown in FIG. 3, at 310, the terminal device 110 determines a COT structure for accessing a radio channel between the terminal device 110 and the network device 120. The channel occupancy time structure may indicate a set of time-domain resources for accessing the channel. The set of time-domain resources may refer to COT.

In some example embodiments, a COT structure may indicate a plurality of subsets of time-domain resources for at least one transmission occurred in the COT. The COT may be initiated by the terminal device 110 for a UL transmission or by the network device 120 for a DL transmission.

The terminal device 110 may receive the DCI from the network device 120. The COT structure may be indicated in Downlink Control information (DCI). For example, the terminal device 110 may obtain at least one of a Slot Format indicator and a duration indicator associated with the COT structure from the DCI. Based on the at least one of indicator, the COT structure may be determined.

In some example embodiments, it is also possible that the terminal device 110 cannot determine whether there is a COT structure associated with the UL transmission, because the terminal device 110 cannot obtain such indication from DCI, when the UL transmission is occurred in an initial access procedure, or in radio resource configuration idle (RRC_idle) mode.

At 320, the terminal device 110 set a timing advance for a UL transmission based on the COT structure.

Figure 4:
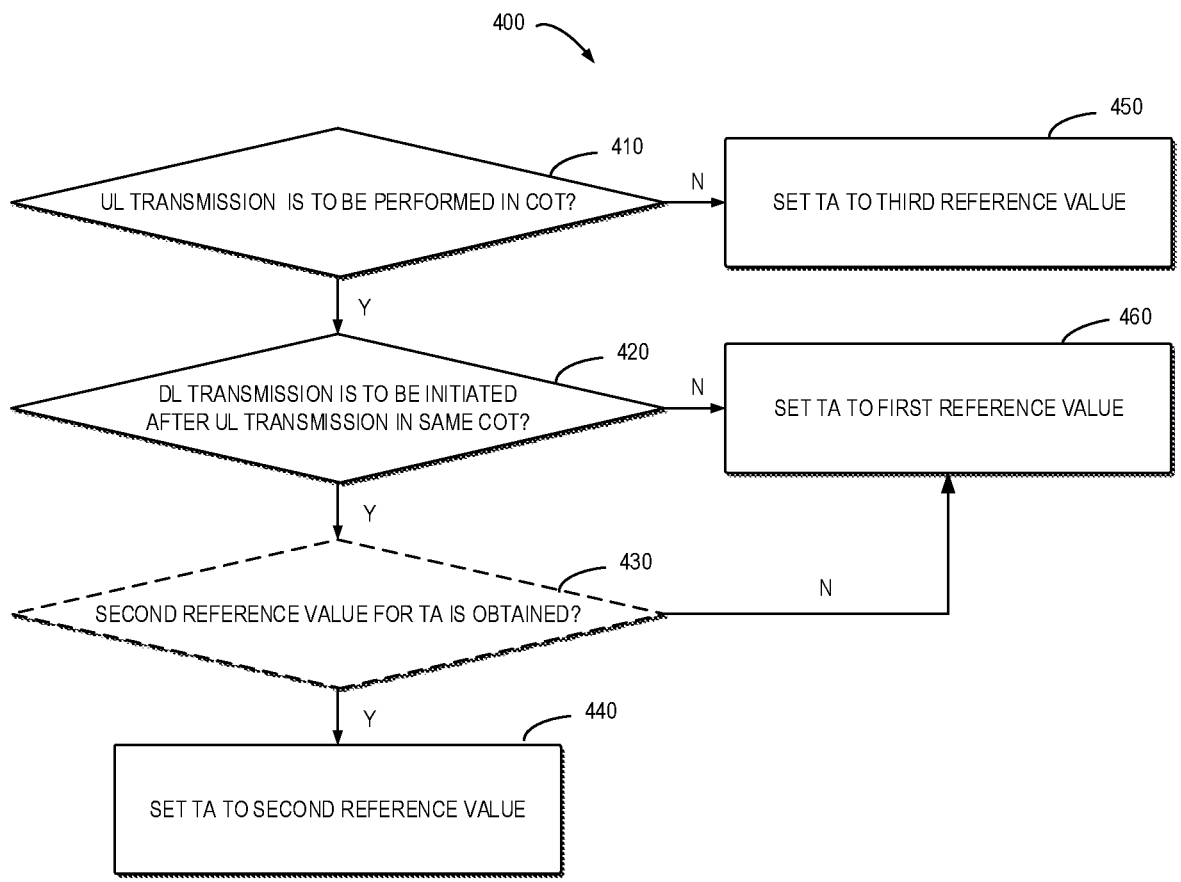
FIG. 4 shows a flowchart of an example method for determining the TA on demand according to some example embodiments of the present disclosure.

FIG. 4 shows a flowchart of an example method for determining the TA on demand according to some example embodiments of the present disclosure. With reference to FIG. 4, a process for determining the TA will be further described as below.

At 410, if the terminal device 110 determines a COT structure exist and the UL transmission is to be performed in the COT, the terminal device 110, at 420, may determine whether a DL transmission is to be initiated after the UL transmission.

In some example embodiments, the COT may be initiated by the network device 120. In this case, a DL transmission is performed before the UL transmission in the COT. The terminal device 110 may determine whether there is another DL transmission following the UL transmission.

In some example embodiments, if a COT is initiated by the terminal device 110 for a UL transmission, the terminal device 110 may determine whether a DL transmission is to be initiated after the UL transmission.

If the terminal device 110 determines a DL transmission is to be initiated after the UL transmission, as an option, at 430, the terminal device 110 may determine whether there is a second reference value for a TA for this case. The second reference value may relate to the compensation period $N_{TA}$ and a sensing time period, for example, 25 [μs] or 16 [μs], for a type of LBT procedure. For example, the TA may be set to as $N_{TA} \times T_c + 25$ [μs] or $N_{TA} \times T_c + 16$ [μs].

If the terminal device 110 determines there is a second reference value for a TA, at 440, the terminal device 110 may set the TA to the second reference value.

If the terminal device 110 determines the second reference value for a TA cannot be obtained, at 460, the terminal device 110 may set the TA to a first reference value.

For example, the first reference value may relate to a compensation period $N_{TA}$ and a switching period $N_{TA\ offset}$. As mentioned above, $N_{TA}$ may be referred to as a time period for compensating propagation delay from the terminal device 110 to the network device 120 and $N_{TAoffset}$ may be used to provide enough gap for the network device 120 to switch from Rx mode to Tx mode.

In this case, the first reference value may equal to $(N_{TA} + N_{TAoffset}) \times T_c$, which may be considered as a default TA value obtained from the a high layer signaling, such as MAC CE.

In some example embodiments, if the terminal device 110 determines a DL transmission is not to be initiated after the UL transmission, the terminal device 110 may, at 460, also set the TA to a first reference value.

For the case where a DL transmission is not to be initiated after the UL transmission, if a COT is initiated by the terminal device 110 for a UL transmission, the COT structure may only refer to the UL transmission. If a COT is initiated by the network device 120 for a DL transmission, the UL transmission may occur after the DL transmission.

If, at 410, the terminal device 110 cannot determine a COT structure exist, the terminal device 110 may, at 450, set the TA to a third reference value. The third reference value may relate to sensing time period for a LBT period, which may be predefined by the network device. In this case, the sensing time period can be set to 16 [μs] or 25 [μs].

In some example embodiments, the terminal device 110 may receive an indication of at least one of the first, second and third reference value of TA from the network device 120. In some example embodiments, the indication may be obtained via at least one of broadcast system information, DCI, RRC signaling or MAC CE. In some example embodiments, the first, second and third reference value of TA may be predefined.

In this way, a dynamic adjustment of TA is allowed at the UE, which ensures that a desire duration of the gaps of the channel occupancy at different transmission scenarios.

Figure 5:
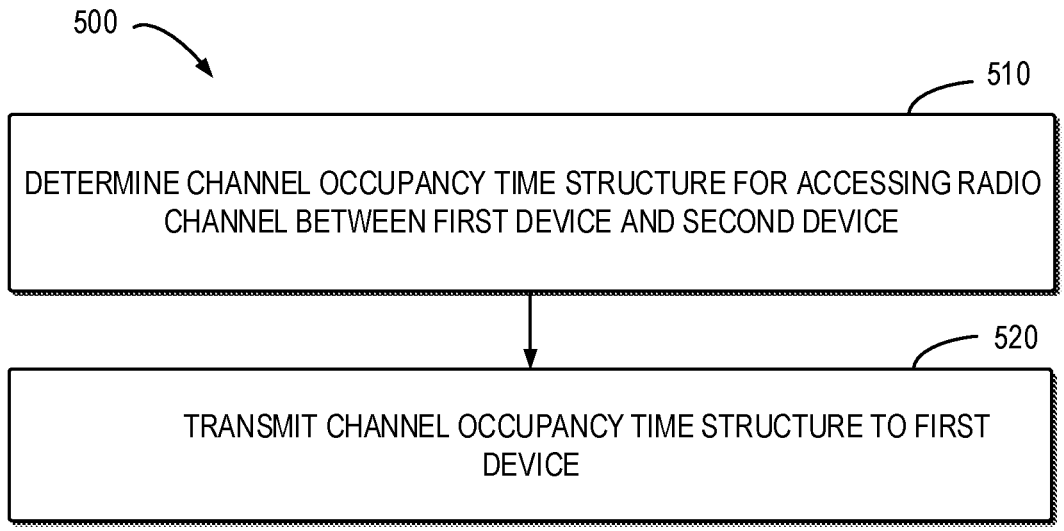
FIG. 5 shows a flowchart of an example method of the adjustment of the TA according to some example embodiments of the present disclosure.

FIG. 5 shows a flowchart of an example method 500 of the adjustment of the TA according to some example embodiments of the present disclosure. The method 300 can be implemented at the network device 120 as shown in FIG. 1. For the purpose of discussion, the method 500 will be described with reference to FIG. 1.

At 510, the network device determines a COT structure for accessing a radio channel between a terminal device and the network device. The COT may indicate a set of time-domain resources for accessing the radio channel.

In some example embodiments, the network device may transmit the COT structure via DCI. In some example embodiments, the COT structure is indicated in an indication of the DCI, the indication comprising at least one of a slot format indicator and a duration indicator associated with the COT.

In some example embodiments, the network device may transmit an indication of at least one of a first reference value of the timing advance relating to a compensation period for a delay of the transmission and a switching period for the network device to switch from a receiving mode to a transmitting mode; a second reference value of the timing advance relating to the compensation period and a sensing time period for a LBT procedure and a third reference value of the timing advance relating to the sensing time period.

In some example embodiments, the network device may transmit the indication via at least one of broadcast system information, DCI, RRC signaling or MAC CE.

In some example embodiments, an apparatus capable of performing the methods 300 and 400 (for example, implemented at the terminal device 110) may comprise means for performing the respective steps of the methods 300 and 400. The means may be implemented in any suitable form. For example, the means may be implemented in a circuitry or software module.

In some example embodiments, the apparatus comprises means for determining a channel occupancy time structure for accessing a radio channel between the first device and a second device, the channel occupancy time structure indicating a set of time-domain resources for accessing the radio channel; and means for setting a timing advance for a transmission from the first device to the second device based on the channel occupancy time structure.

In some example embodiments, an apparatus capable of performing the method 500 (for example, implemented at the network device 120) may comprise means for performing the respective steps of the method 500. The means may be implemented in any suitable form. For example, the means may be implemented in a circuitry or software module.

In some example embodiments, the apparatus comprises means for determining a channel occupancy time structure for accessing a radio channel between a first device and the second device, the channel occupancy time structure indicating a set of time-domain resources for accessing the radio channel; and means for transmitting the channel occupancy time structure to the first device, to cause the first device to determine a timing advance for a transmission from the first device to the second device.

Figure 6:
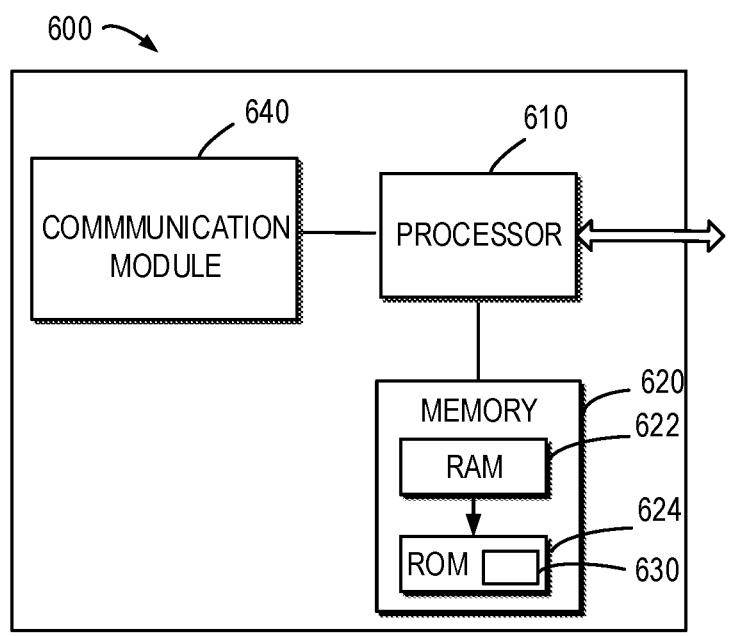
FIG. 6 shows a simplified block diagram of a device that is suitable for implementing example embodiments of the present disclosure.

FIG. 6 is a simplified block diagram of a device 600 that is suitable for implementing embodiments of the present disclosure. The device 600 may be provided to implement the communication device, for example the terminal device 110 or the network device 120 as shown in FIG. 1. As shown, the device 600 includes one or more processors 610, one or more memories 640 coupled to the processor 610, and one or more transmitters and/or receivers (TX/RX) 640 coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 620. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 3-5. The embodiments of the present disclosure may also be implemented by hardware or by a combination of software and hardware.

Figure 7:
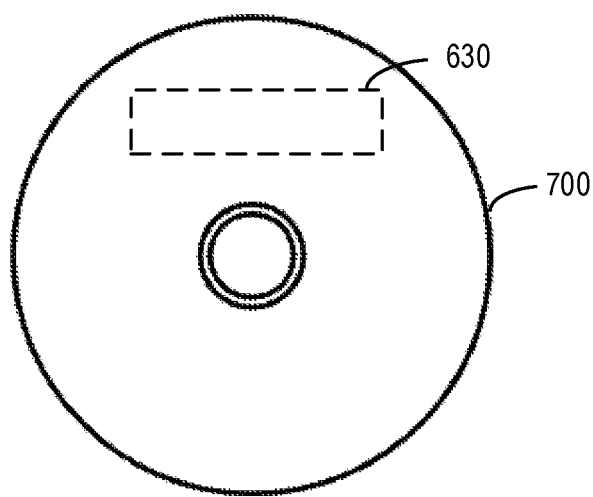
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 as described above with reference to FIGS. 3-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory including computer program codes;
the at least one memory and the computer program codes are configured to, with the at least one processor, cause the first device at least to:
determine a channel occupancy time structure for accessing a radio channel between the first device and a second device, the channel occupancy time structure indicating a set of time-domain resources for accessing the radio channel;
receive, from the second device, an indication of the following: a first reference value of the timing advance relating to a compensation period for a delay of the transmission and a switching period for the second device to switch from a receiving mode to a transmitting mode; a second reference value of the timing advance relating to the compensation period and a sensing time period for a LBT procedure; and a third reference value of the timing advance relating to the sensing time period;
determine that the channel occupancy time structure is unascertainable; and
based on a determination that the channel occupancy time structure is unascertainable, set a timing advance to the third reference value for a transmission from the first device to the second device.

2. The first device of claim 1, wherein the first device is caused to determine the channel occupancy time structure by:
receiving, from the second device, downlink control information for the transmission; and
determining the channel occupancy time structure based on the downlink control information.

3. The first device of claim 2, wherein the first device is caused to determine the channel occupancy time structure based on the downlink control information by:
obtaining an indication from the downlink control information, the indication comprising at least one of the following:
a slot format indicator; and
a duration indicator associated with the channel occupancy time structure; and
determining the channel occupancy time structure based on the indication.

4. The first device of claim 1, wherein the first device is caused to receive the indication via at least one of the following:
broadcast system information,
downlink control information,
a radio resource configuration signaling, and
Medium Access Control, Control Element.

5. The first device of claim 1, wherein the first device is further caused to:
determine an initial time point for the transmission based on the timing advance and the set of time-domain resources; and
cause the transmission to be started at the initial time point.

6. The first device of claim 1, wherein the first device comprise a terminal device and the second device comprises a network device.

7. A second device comprising:
at least one processor; and
at least one memory including computer program codes;
the at least one memory and the computer program codes are configured to, with the at least one processor, cause the second device at least to:
determine a channel occupancy time structure for accessing a radio channel between a first device and the second device, the channel occupancy time structure indicating a set of time-domain resources for accessing the radio channel;
transmit an indication of the following: a first reference value of the timing advance relating to a compensation period for a delay of the transmission and a switching period for the second device to switch from a receiving mode to a transmitting mode: a second reference value of the timing advance relating to the compensation period and a sensing time period for a LBT procedure; and a third reference value of the timing advance relating to the sensing time period; and
transmit the channel occupancy time structure to the first device, wherein the the timing advance is set to the third reference value based on a determination that the channel occupancy time structure is unascertainable by the first device.

8. The second device of claim 7, wherein the second device is caused to transmit the channel occupancy time structure by:
transmitting the channel occupancy time structure via Downlink Control Information.

9. The second device of claim 8, wherein the channel occupancy time structure is indicated in an indication of the downlink control information, the indication comprising at least one of the following:
a slot format indicator; and
a duration indicator associated with the channel occupancy time structure.

10. The second device of claim 7, wherein the second device is caused to transmit the indication by:
transmitting the indication via at least one of the following:
broadcast system information,
downlink control information, and
a radio resource configuration signaling, and
Medium Access Control, Control Element.

11. The second device of claim 7, wherein the first device comprise a terminal device and the second device comprises a network device.

12. A method comprising:
determining, by a first device, a channel occupancy time structure for accessing a radio channel between the first device and a second device, the channel occupancy time structure indicating a set of time-domain resources for accessing the radio channel;
receiving, by the first device from the second device, an indication of the following: a first reference value of the timing advance relating to a compensation period for a delay of the transmission and a switching period for the second device to switch from a receiving mode to a transmitting mode: a second reference value of the timing advance relating to the compensation period and a sensing time period for a LBT procedure; and a third reference value of the timing advance relating to the sensing time period:

determining, by the first device, that the channel occupancy time structure is unascertainable; and based on the determination that the channel occupancy time structure is unascertainable, setting, by the first device, a timing advance to the third reference value for a transmission from the first device to the second device.

13. The method of claim 12, wherein determining the channel occupancy time structure comprises:

receiving, from the second device, downlink control information for the transmission; and determining the channel occupancy time structure based on the control information.

14. The method of claim 12, wherein determining the channel occupancy time structure based on the downlink control information comprises:

obtaining an indication from the downlink control information, the indication comprising at least one of the following:

a slot format indicator; and a duration indicator associated with the channel occupancy time structure;

determining the channel occupancy time structure based on the indicator.

* * * * *